United States Patent [19]

Evertz et al.

[11] 3,957,387

[45] May 18, 1976

[54] HOLDING DEVICE FOR MANUALLY PORTABLE DRILLING MACHINES

[75] Inventors: Egon Evertz; Rolf Seybold, both of Solingen, Germany

[73] Assignee: Egon Evertz, Solingen, Germany

[22] Filed: Mar. 24, 1975

[21] Appl. No.: 561,314

[30] Foreign Application Priority Data

Mar. 29, 1974 Germany .......................... 2415273

[52] U.S. Cl. .................................. 408/78; 144/104; 173/32; 408/92; 408/234; 408/712

[51] Int. Cl.² .......................................... B23B 45/14

[58] Field of Search ................. 408/77, 78, 92, 130, 408/234, 236, 712; 173/22, 23, 32, 33; 144/103, 104, 106

[56] References Cited

UNITED STATES PATENTS

| | | | |
|---|---|---|---|
| 2,333,589 | 11/1943 | Schawer | 408/77 X |
| 2,947,,205 | 8/1960 | Wilson | 408/92 |
| 3,417,949 | 12/1968 | Waber | 408/92 X |

*Primary Examiner*—Othell M. Simpson
*Assistant Examiner*—Z. R. Bilinsky
*Attorney, Agent, or Firm*—Finnegan, Henderson, Farabow & Garrett

[57] ABSTRACT

A holding device for a manually portable drilling machine includes a detachable tension element which is attached at two mutually opposite points to a carrier member for the portable drilling machine, the tension element being sufficiently long to encircle at least the horizontal circumference of the object to be drilled at the vertical level of the hole to be drilled. In addition the device includes a resilient bracing means provided between the portable drilling machine and the tension element when the drilling machine is located at a drilling site and the tension element is secured to the carrier so as to be in tension around the object to be drilled.

7 Claims, 2 Drawing Figures

HOLDING DEVICE FOR MANUALLY PORTABLE DRILLING MACHINES

This invention concerns a holding device for manually portable drilling machines which are used for executing drilling operations in the exterior walls of upright cylindrical or prismatic objects, such as primarily the ingot moulds used in steel works.

The initial positioning of a portable drilling machine in correct alignment with the intended drilling point as well as supporting such a machine during drilling requires considerable physical effort so that it has become common practice to provide a further wall in the vicinity of the object to which the machine is to be applied, from which further wall the portable drilling machine may be resiliently supported at least during the drilling operation. For example, in the case of said object being an ingot mould used for casting steel, the mould would be placed near to another mould or near to a wall, but would have to be re-positioned if drilling were required on another side of the mould. In view of the substantial weight of steel ingot moulds and similar objects this involves a great deal of crane-work and manipulation. On the other hand, where no further wall is available to provide the necessary support, the operators have to provide a considerable effort supporting the drilling machine in addition to the work of aligning the machine.

The object of this invention is to achieve a substantial reduction in the work effort required for aligning and supporting a drilling machine whereby in particular it is possible to dispense with the need for moving the object to be drilled for setting purposes by means of a crane or like equipment.

According to the invention, this object is achieved by the provision of a detachable tension element attached at two mutually opposite points to a carrier member provided for the portable drilling machine, said tension element being sufficiently long to encircle at least the horizontal circumference of the object to be drilled at the vertical level of the bore to be drilled in its wall, and resilient bracing means which is provided between the portable drilling machine and the tension element when the drilling machine is located at a drilling site and the tension element is secured to the carrier member and is in tension around the object to be drilled.

In this simple manner the portable drilling machine is firmly located under tension relative to the object into the wall of which it is intended to drill a hole. For this purpose the portable drilling machine with the tension element secured to one attachment point of the carrier member may be positioned at the site where the hole is to be drilled, whereafter the operator takes the free end of the tension element passes it around the object and finally secures it to the other attachment point on the carrier member. After the drilling machine has been correctly aligned with the intended drilling site final tension is applied whereupon the drilling machine which is now subject to the resilient support thus provided may be switched on. The operator now merely has to keep the carrier member, which is conveniently formed with a gripping handle, in balanced position and it is particularly easy for him to guide the drilling bit in the bore because he is now relieved of all other strain or effort.

A further simplification in position alignment of the portable drilling machine with regard to the point at which the hole is to be drilled is achieved by reason of the fact that the carrier member is mounted on a support having one or more runner wheels at its bottom end whilst its top end is formed as a gripping handle. Conveniently a locking device is used for the runner wheels and it is a further advantage for the support to comprise a bracing strut hinged thereto and adapted to be folded down pivotally in a plane perpendicular relative to the axis of the portable drilling machine.

By means of the above arrangement, it is possible for a single workman to wheel the portable drilling machine to the working site and, after actuating the locking device for the runner wheel or wheels, to raise the support up to the level of the intended drilling point. Then the bracing strut may be folded down whereupon the entire device is stable and self-supporting. Now the workman may take the free end of the tension element and secure it to the carrier member after having looped it once around the object to the drilled. Now all preparations are completed and the drilling operation may be started immediately without there being any need for the carrier member with the drilling machine fitted therein to be lifted at all. The effort required from the operator in this case is again confined to that needed to balance the drilling machine and thereby ensure that there will be no shift of the drilling axis from its predetermined position.

Insofar as this descriptive text of the invention refers to a tension element, it will be understood that this may preferably be a rope, cable, chain or strap. The detachable connection for the tension element need not necessarily be at the point of attachment to the carrier member, since such connection may also be established by means of a buckle fastening or the like between the free ends of two tension elements having their other ends attached to the carrier member.

For further illustration of this invention we refer to the accompanying drawings relating to one example thereof and wherein.

Figure 1:
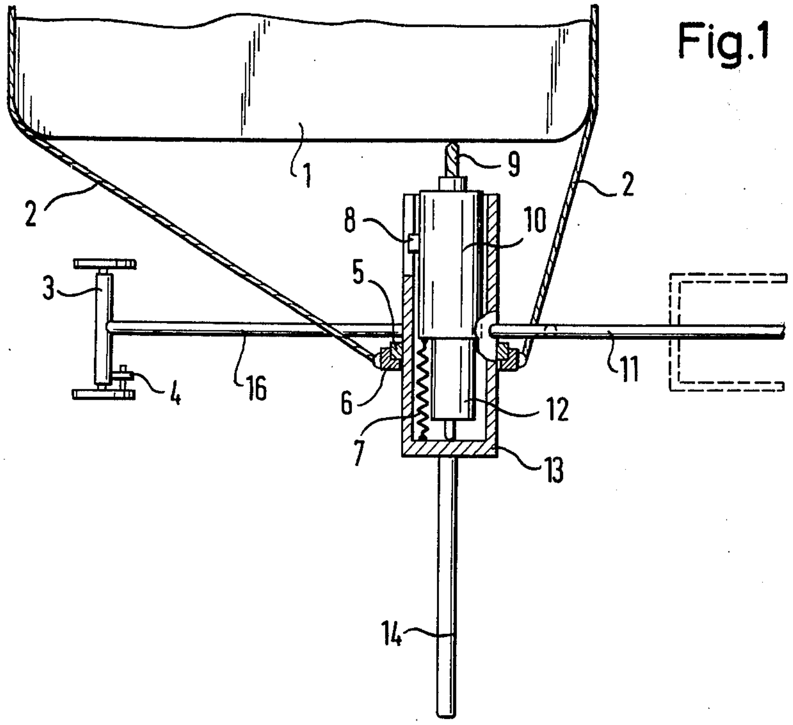
FIG. 1 is a plan view, partly in section, of the new holding device.
Figure 2:
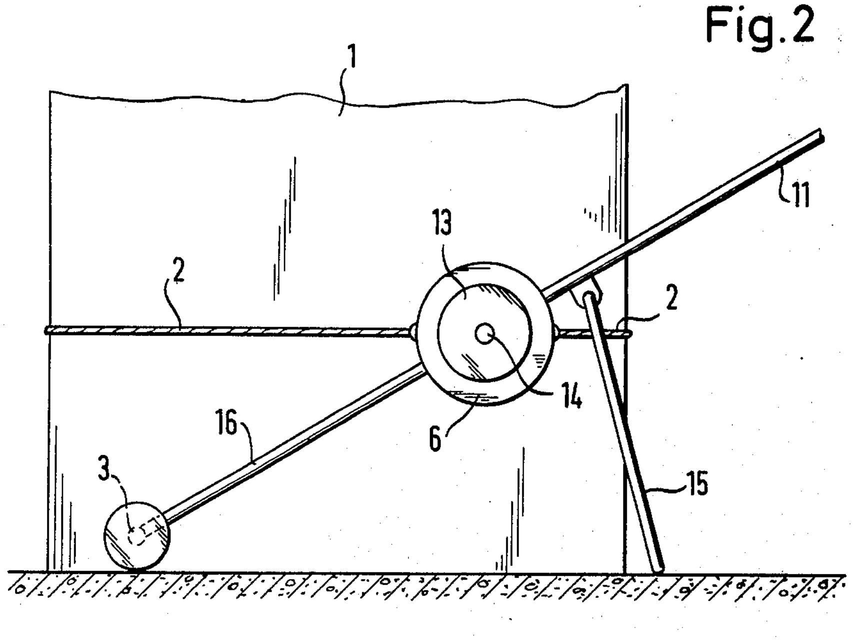
FIG. 2 is a lateral view of the device shown in FIG. 1.

Referring to the drawings, FIG. 1 shows a portion of a wall 1 of an ingot mould already encircled by a tension element, here in the form of a rope 2. Since only part of the mould circumference has here been illustrated, the encircling loop is correspondingly drawn only up to the illustrated part of the ingot mould wall. The tension element 2 is tautly tensioned and secured at both its ends to two mutually opposite points on a rotatable ring 6, the latter being rotationally mounted on a fixed ring 5, which is rigidly secured to the outer circumference of a cylindrical casing 13.

Within the casing 13 is received a manually portable drilling machine 10 with its drilling tool 9 applied to a point previously marked out on the vertical wall of the ingot mould. The drilling machine 10 has a lateral projection 8 which is longitudinally slidable in a groove formed in the casing 13 so as to assure non-rotational guidance for the drilling machine 10 in the casing 13. Furthermore, at the end of the drilling machine 10 remote from the drilling bit 9 there is provided a cylinder 12 adapted to be charged with compressed air, and whereof the associated piston rod is supported against an end wall of the casing 13. This arrangement ensures a drilling operation under constant pressure during which the tension element 2 remains constantly under tension.

In addition there is provided in the casing 13 a tension spring 7 which ensures that the drilling machine 10 is always held in the casing. Naturally the force of the tension spring 7 is substantially less than that capable of being applied by the cylinder 12.

The casing 13 includes a gripping handle 14, situated at the end of the casing remote from the drilling tool, and by means of which the casing 13 together with the drilling machine 10 inserted therein may be kept in alignment with the intended drilling site. However, as has already been explained, this operation requires the application of no more force than needed to maintain equilibrium.

Moreover, the casing 13 is mounted on a support 16 whose lower end carries a hub 3 for two runner wheels whilst its upper end is shaped to define a further gripping handle 11. Alternatively, as indicated in broken lines, the upper end may take the form of a forked handle. Accordingly, the portable drilling machine accommodated in the casing 13 may be easily wheeled to any given working site and, by raising the support, may be raised to the correct height level at which the hole is to be drilled. The runner wheels are provided with a locking device 4 to prevent the entire system from running away or being dislocated when in its raised position.

Once the correct drilling site has been reached by raising the support 16 with the runner wheels stationary and locked, a bracing strut 15 hinged to the support 16 is finally folded down. This strut 15 is pivotable in a plane perpendicular to the axis of the drilling machine. After the strut 15 has been folded down it forms a leg and the entire arrangement is now properly positioned at the intended drilling site. As has been described, the only further thing required is for the operator to walk around the ingot mould with the tension element 2, the latter having one end secured to the casing 3 or to the rotatable ring 6, whereafter, lastly, the other end is tautly secured to the rotatable ring 6. Now compressed air may be fed to the cylinder 12 whereupon the drilling tool 9 will be firmly pressed against the ingot mould wall at the predetermined point of drilling. After the drilling machine is switched on the further drilling operation will occur under constant pressure.

We claim:

1. A holding device for manually portable drilling machines used for executing drilling operations in the exterior walls of upright, cylindrical or prismatic objects, the device including a hollow casing adapted to receive the portable drilling machine therein, said casing having an outer circumference, means carried by said casing for non-rotationally guiding the drilling machine for movement relative to the casing in a longitudinal direction toward and away from the object to be drilled, a fixed ring rigidly secured to the outer circumference of the casing, a second ring rotatably mounted about said first ring, a detachable tension element attached at two mutually opposite points to said second ring, said tension element being sufficiently long to encircle at least the horizontal circumference of the object to be drilled at the vertical level of the hole to be drilled in its wall, resilient bracing means provided between the portable drilling machine and the tension element when the drilling machine is located at a drilling site and the tension element is secured to the rotatable ring and is in tension around the object to be drilled, and a support on which the casing is mounted and having at least one runner wheel at its bottom end, a gripping handle adjacent the upper end of said support, a hub carried by said support adjacent its lower end and carrying said runner wheel, the hub extending parallel to said longitudinal direction.

2. A holding device according to claim 1 wherein said casing is elongated in said longitudinal direction and has an end wall remote from the object to be drilled, said resilient bracing means being located between said end wall of the casing and the drilling machine received in the casing.

3. A holding device according to claim 1, wherein the resilient bracing means comprises a pneumatic cylinder unit.

4. A holding device according to claim 1, and including means for locking said at least one runner wheel.

5. A holding device according to claim 4 including a bracing strut pivotally connected to said support at a location therealong between said casing and said handle for downward movement in a plane perpendicular to the axis of the casing.

6. A holding device according to claim 1, wherein the casing includes a gripping handle on its end remote from the drilling tool.

7. A holding device according to claim 1 wherein said support includes an elongated bar terminating at its lower end in said hub and at its upper end in said handle, the long axis of said bar extending through said casing.

* * * * *